United States Patent
Malone et al.

(10) Patent No.: US 6,989,990 B2
(45) Date of Patent: Jan. 24, 2006

(54) HIGH SERVICEABILITY LIQUID COOLING LOOP USING TUBING HINGE

(75) Inventors: Christopher G. Malone, Loomis, CA (US); Glenn C. Simon, Auburn, CA (US); Stephan K. Barsun, Sacramento, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2 days.

(21) Appl. No.: 10/835,961

(22) Filed: Apr. 29, 2004

(65) Prior Publication Data

US 2005/0243517 A1  Nov. 3, 2005

(51) Int. Cl.
*H05K 7/20* (2006.01)

(52) U.S. Cl. ............ 361/699; 361/688; 361/689; 361/704; 361/711; 361/719; 165/80.4; 165/104.33; 174/15.1

(58) Field of Classification Search .............. 361/698, 361/699, 700, 711; 257/714, 715; 174/15.1, 174/15.2; 165/80.4; 285/98, 315
See application file for complete search history.

(56) References Cited

U.S. PATENT DOCUMENTS

| 3,990,730 A | * | 11/1976 | Ekman .................. 285/110 |
| 4,455,504 A | | 6/1984 | Iversen |
| 4,712,609 A | | 12/1987 | Iversen |
| 4,913,471 A | * | 4/1990 | Huneke .................. 285/281 |
| 5,419,594 A | * | 5/1995 | Nelms ..................... 285/315 |
| 5,560,362 A | | 10/1996 | Sliwa, Jr. et al. |
| 5,847,925 A | * | 12/1998 | Progl et al. ............. 361/687 |
| 6,125,035 A | * | 9/2000 | Hood et al. ............ 361/687 |
| 6,137,683 A | * | 10/2000 | Lee et al. ............... 361/704 |
| 6,173,761 B1 | | 1/2001 | Chandratilleke et al. |
| 6,529,377 B1 | | 3/2003 | Nelson et al. |
| 6,641,179 B1 | * | 11/2003 | Decoteau et al. ......... 285/379 |
| 6,708,754 B2 | * | 3/2004 | Wei ........................ 165/46 |

FOREIGN PATENT DOCUMENTS

| GB | 2349985 A | 5/1999 |
| GB | 2387630 A | 3/2002 |
| GB | 2386679 A | 4/2002 |

* cited by examiner

*Primary Examiner*—Boris Chérvinsky (57) ABSTRACT

A cylindrical tubing hinge extends around and couples two segments of rigid or semi-rigid tubing and enables rotational motion of one segment relative to the other.

16 Claims, 8 Drawing Sheets

HIGH SERVICEABILITY LIQUID COOLING LOOP USING TUBING HINGE

BACKGROUND OF THE INVENTION

Electronic systems and equipment such as computer systems, network interfaces, storage systems, and telecommunications equipment are commonly enclosed within a chassis, cabinet or housing for support, physical security, and efficient usage of space. Electronic equipment contained within the enclosure generates a significant amount of heat. Thermal damage may occur to the electronic equipment unless the heat is removed.

Compact electronic systems and devices, for example compact computer servers, often have very little space available for implementing a cooling solution. Conventional air-cooled heat sinks generally must be directly connected to the heat source. The footprint of the heat sink cannot be much larger than the heat source given the intrinsic heat spreading resistance of an aluminum or copper heat sink. Given the restriction on heat sink height dictated by the form factor and the practical limits on heat sink footprint, cooling capabilities are highly restricted.

SUMMARY

In accordance with an apparatus, a cylindrical tubing hinge extends around and couples two segments of rigid or semi-rigid tubing and enables rotational motion of one segment relative to the other.

BRIEF DESCRIPTION OF THE DRAWINGS

Embodiments of the invention relating to both structure and method of operation, may best be understood by referring to the following description and accompanying drawings.

DETAILED DESCRIPTION

Future electronic system architectures, such as compact server architectures, may use a liquid loop cooling solution to accommodate increasing power and density levels of microprocessors and associated electronics. A liquid loop system may have a pump to drive cooling fluid through cold plates attached to processors and other high-power components, and drive the fluid along tubes completing a loop between a cold plate, a heat exchanger, and the pump. One or more heat-dissipating elements can be connected to the liquid loop tubing and associated with the components, in particular heat-generating components, to apply cooling directly to heat sources, facilitating system cooling. Heat is removed from the loop by forced-air convection at the heat exchanger.

A tubing hinge in a liquid loop enables serviceability of a component, such as a heat-dissipating component.

A cold plate is a heat exchanger in a liquid cooling loop, for example a single-phase cooling loop, that transfers heat from a heat-dissipating component to liquid via conduction and convection. In most liquid loops, the cold plate is rigidly or semi-rigidly attached to the remainder of the liquid cooling loop, making addition, removal, or replacement of the heat-dissipating component difficult. In the illustrative system, a hinged hold plate in a liquid cooling loop enables simple and easy addition, removal, or replacement of the heat-dissipating component.

Referring to FIGS. 1A, 1B, 1C, and 1D, perspective pictorial drawings illustrate an embodiment of an apparatus including a cylindrical tubing hinge 100 that extends around and couples two segments 102, 104 of rigid or semi-rigid tubing and enables rotational motion of one segment 102 relative to the other 104 about a rotational axis 106.

Figure 1A:
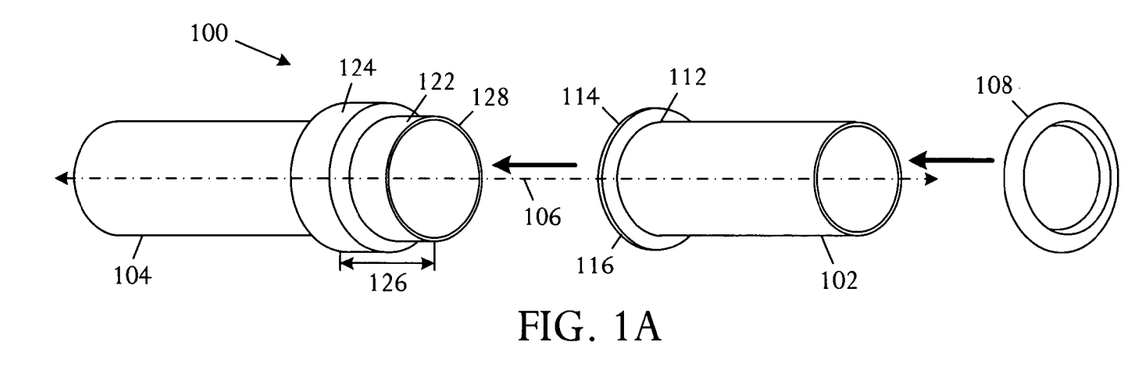
FIGS. 1A, 1B, 1C, and 1D are perspective pictorial drawings illustrating an embodiment of an apparatus including a cylindrical tubing hinge.
Figure 1B:
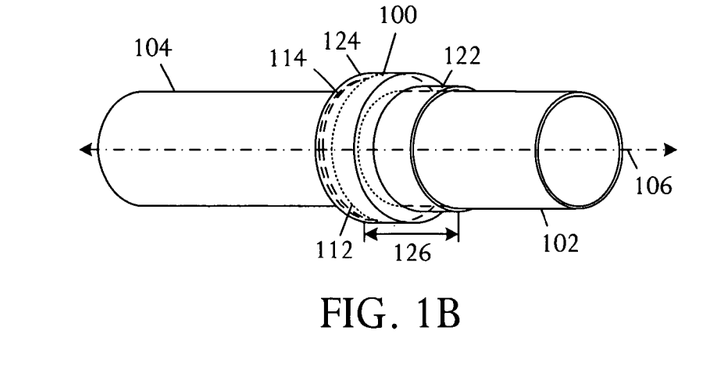
Figure 1C:
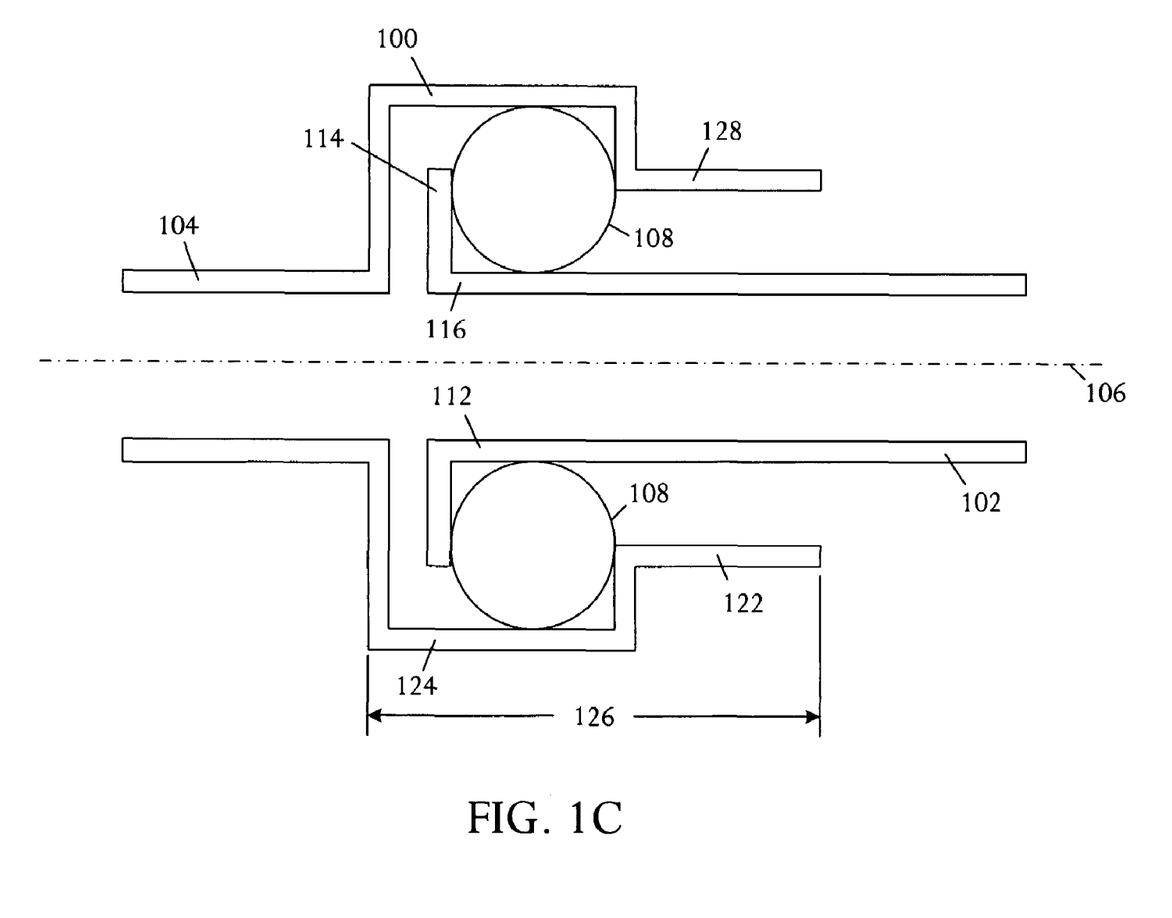
Figure 1D:
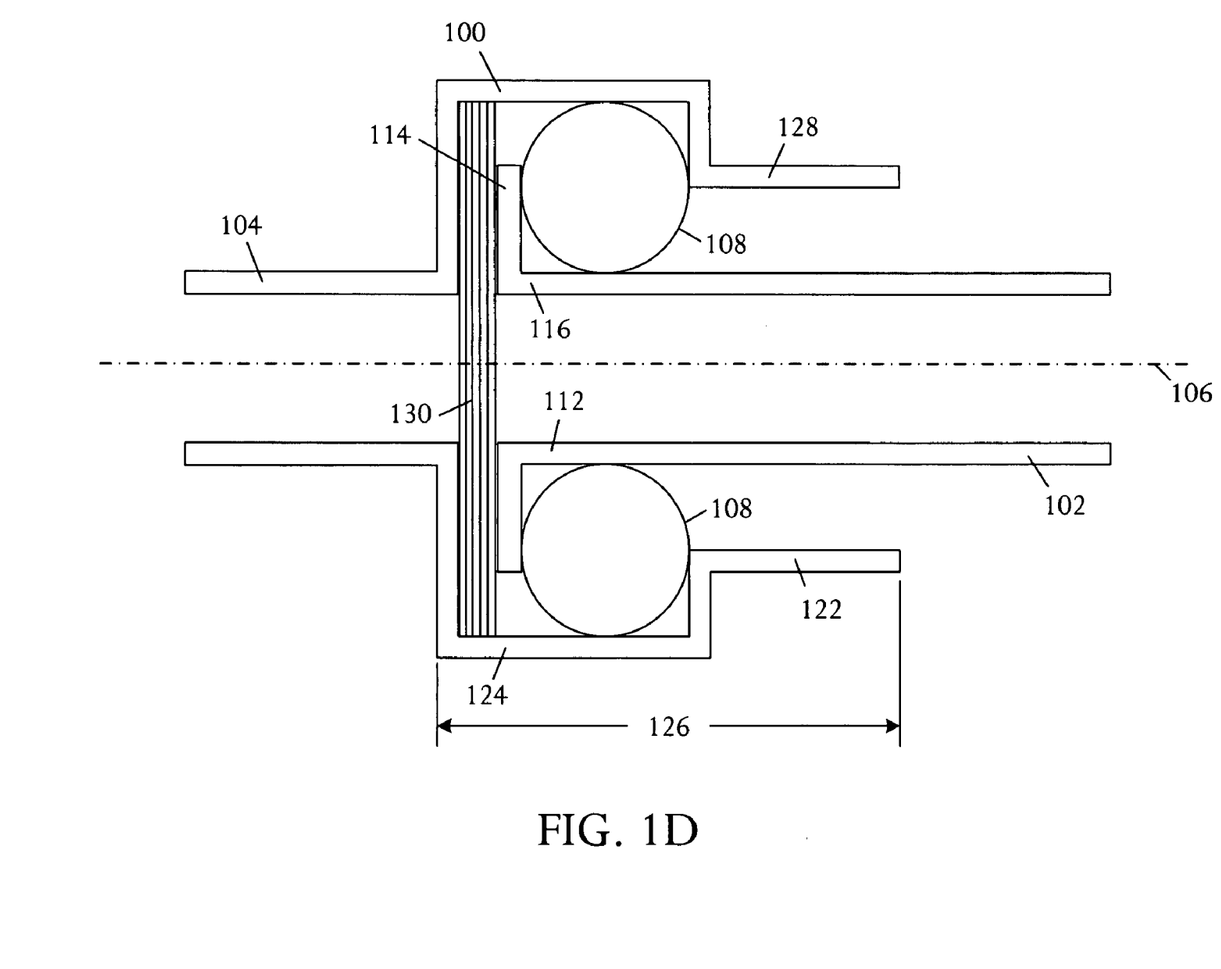

FIG. 1A is an exploded perspective pictorial view showing separated parts of the hinge 100 and connected tubing segments 102, 104. FIG. 1B shows the parts in an assembled configuration. FIG. 1C is a perspective cut-away cross-sectional view showing the relationship of parts of the hinge 100 and tubing when assembled. FIG. 1D is a perspective cut-away cross-sectional view of an implementation that includes a wave spring 130 to keep the o-ring seal compressed. In some embodiments, the tubing hinge 100 further includes first 102 and second 104 tubing segments that can be arranged to share a common longitudinal axis 106. The first 102 and second 104 tubing segments terminate in respective first 112 and second 122 tube ends. A raised lip 114 is formed on the first tube end 112 and extends radially outward relative to the longitudinal axis 106. A raised groove 124 is formed on the second tube end 122 and extends radially outward and returns radially inward relative to the longitudinal axis 106 in a longitudinal second tubing segment section 126.

Referring to FIG. 1B, the first tube end 112 is inserted into the second tube end 122 so that the first tube end raised lip 114 is confined within the second tube end raised groove 124. The tubing hinge 100 may include a ring 108, for example a plastic, rubber, or flexible synthetic O-ring, encircling a longitudinal segment of the first tubing segment 102 adjacent and restrained by the raised lip 114 and contained within the raised groove 124 of the second tube end 122.

In accordance with some embodiments, the tubing hinge 100 includes a male end connector 116 coupled to the first tubing segment 102 and a female end connector 128 coupled to the second tubing segment 104. The male end connector 116 can be inserted into the second tubing segment female end connector 128. The female end connector 128 arrests linear motion of the male end connector 116 from the female end connector 128 while allowing rotational motion of the first 102 and second 104 tubing segments.

The cylindrical tubing hinge 100 can be constructed by forming the raised lip 114 on the end 112 of the first tubing segment 102. The raised lip 114 is arranged to extend radially outward relative to the longitudinal axis 106 of the first tubing segment 102. The hinge 100 can further be constructed by forming the raised groove 124 on the end 122 of the second tubing segment 104. The groove 124 extends radially outward and returns radially inward relative to the longitudinal axis 106 in the longitudinal second tubing segment section 126. The first tubing segment end 112 is inserted into the second tubing segment end 122 so that the first tubing segment end raised lip 114 is confined within the second tubing segment end raised groove 124.

The method for constructing the cylindrical tubing hinge 100 can further include the action of encircling a longitudinal portion of the first tubing segment 102 with the ring 108 so that the ring 108 is adjacent to and restrained by the raised lip 114 and contained within the raised groove 124 of the second tubing segment 104.

In an alternative assembly method, the longitudinal second tubing segment section 126 can be separated into two portions, one including the raised groove 124 and transition area. Internal threads on the raised groove 124 can be slipped over the tube 102 in an area before the flange of the tube 102. A large flange at the end of the second tubing segment 104 can have external threads on the outside edge, and the tubes 102 and 104 can be screwed together after placing the o-ring in place. The spring 130 shown in FIG. 1D is used on the opposite side of the flange from the o-ring, internal to the hinge to compress the o-ring seal.

Figure 2A:
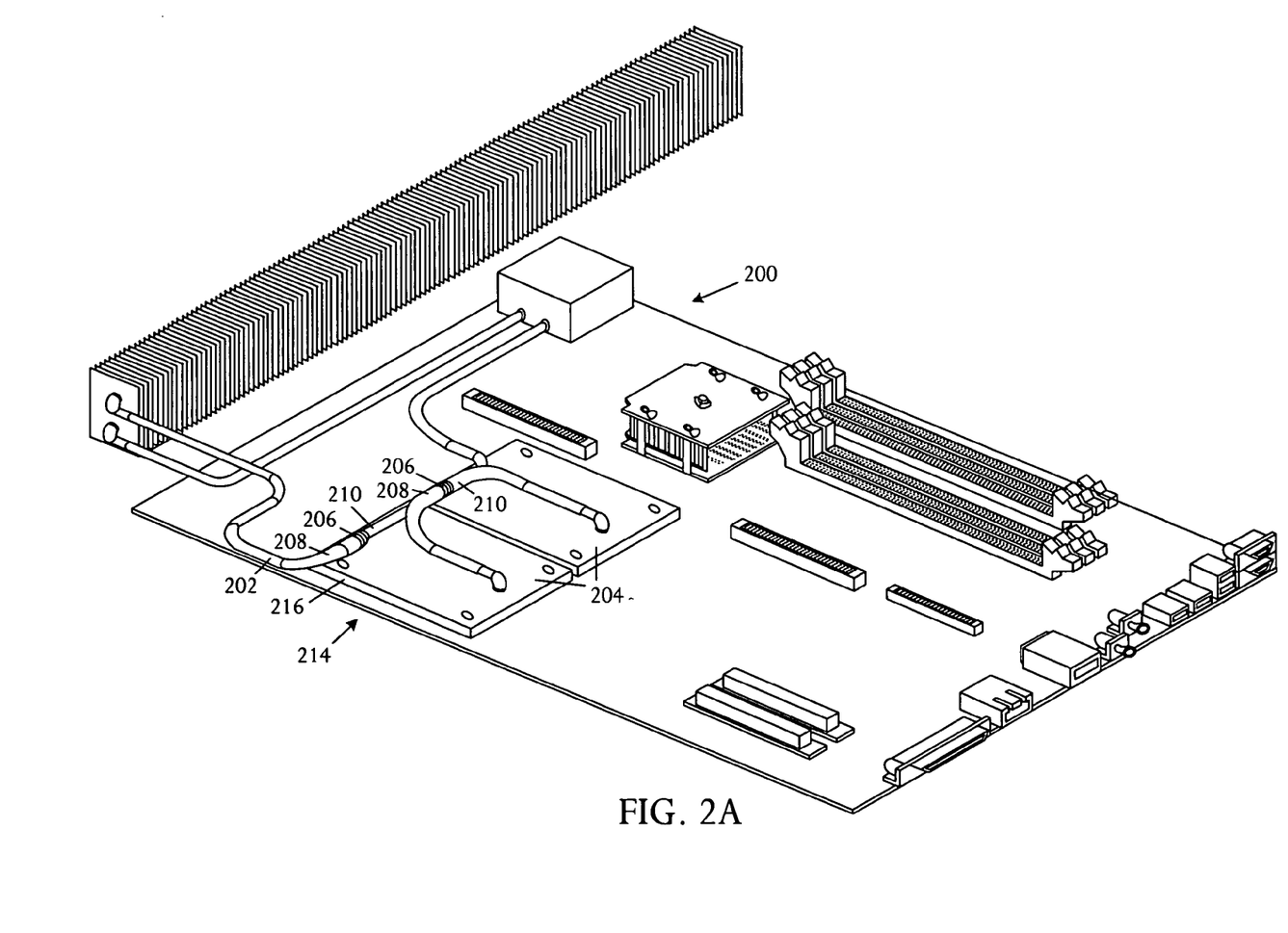
FIGS. 2A, 2B, and 2C are perspective pictorial diagrams illustrating various views and embodiments of liquid loop cooling systems that include a tubing hinge to facilitate serviceability.
Figure 2B:
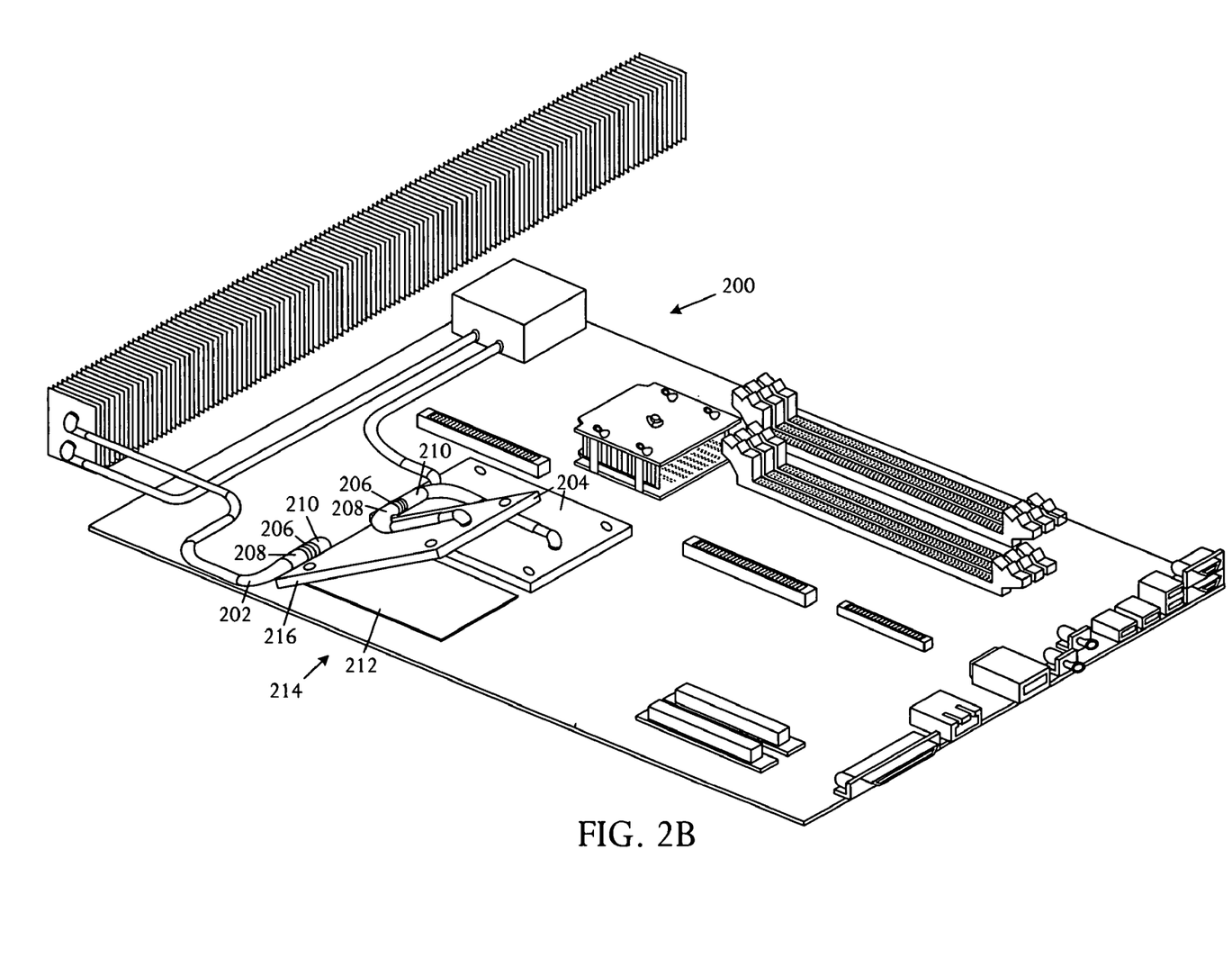
Figure 2C:
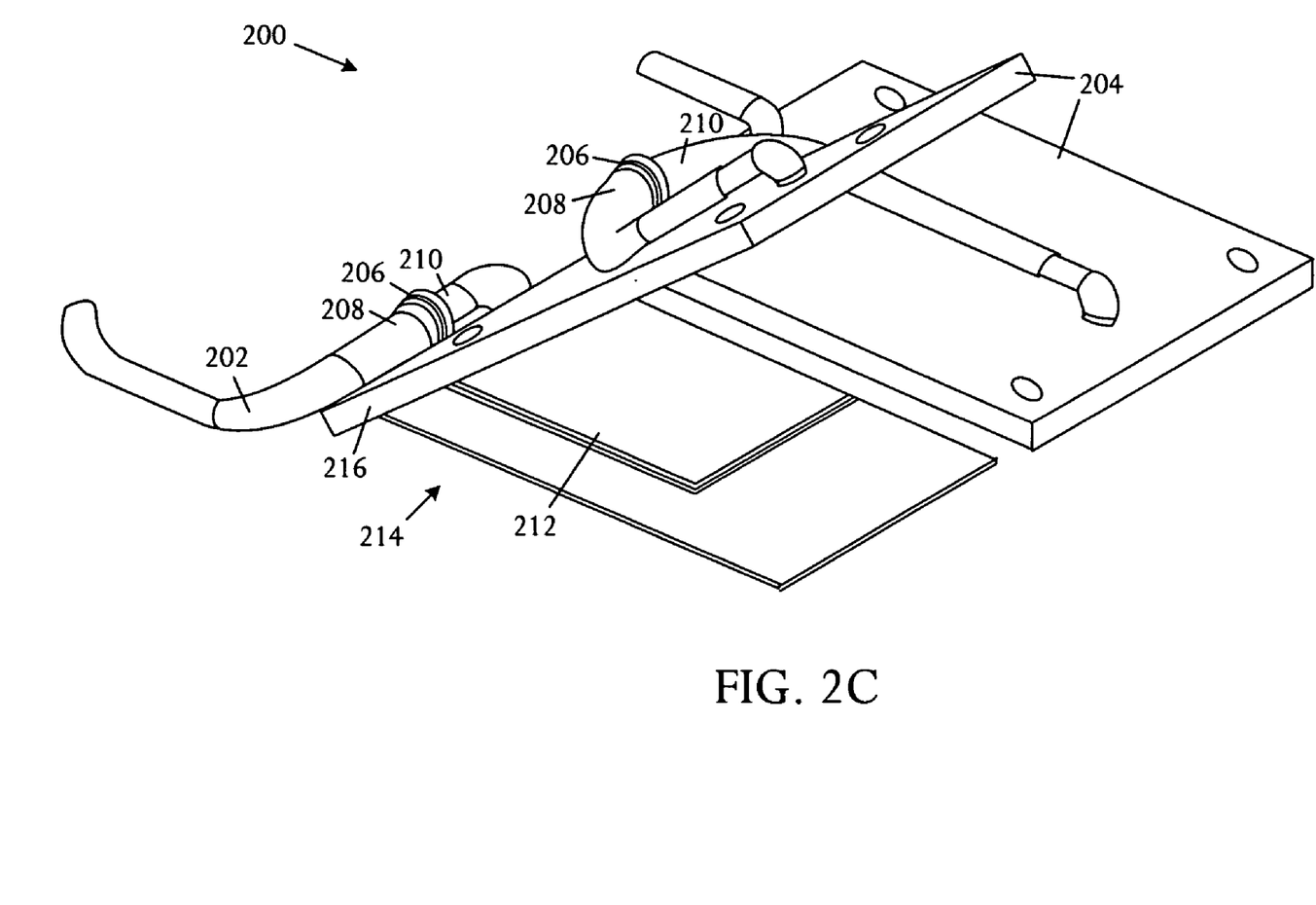

Referring to FIGS. 2A, 2B, and 2C, perspective pictorial diagrams illustrate an embodiment of a liquid loop cooling apparatus 200 including rigid or semi-rigid tubing 202 enclosing an interior bore or lumen within which a cooling fluid can circulate, a moveable cold plate 204 rigidly coupled to the tubing 202, and a cylindrical tubing hinge 206. The cylindrical tubing hinge 206 extends around and couples two segments 208, 210 of the tubing 202 and enables rotational motion of one segment 208 relative to the other 210, flexibly enabling movement of the moveable cold plate 204. FIGS. 1A, 1B, and 1C depict a suitable tubing hinge 100, 206 for usage with the liquid loop cooling apparatus 200. The hinge 100, 206 is a highly compact structure that enables movement or articulation of compact structures with essentially no addition to the internal space or volume utilization of a system.

FIG. 2A shows the liquid loop cooling apparatus 200 with the cold plates 204 in a closed position. FIG. 2B shows the liquid loop cooling apparatus 200 with one of the cold plates 204 in an open position.

The liquid loop cooling apparatus 200 may also include a heat-dissipating component 212 associated with the moveable cold plate 204. The cold plate 204 is moveable to enable addition, replacement, or removal of the heat-dissipating component 212. The cold plate 204 can be rotated up and away from the heat-dissipating component 212 to enable access to the heat-dissipating component 212, for example to enable insertion, removal, testing and the like. FIG. 2C depicts an enlarged view of the liquid loop cooling apparatus 200 with a cold plate 204 opened to further illustrate the heat-dissipating component 212 and associated heat-generating device or component.

Also referring to FIGS. 2A, 2B, and 2C, an embodiment of a liquid loop cooling apparatus 200 includes a cold plate component 214 that further includes a heat-dissipating component 212 and a cover plate 216 that convertibly encloses the heat-dissipating component 212. The liquid loop cooling apparatus 200 further includes rigid or semi-rigid tubing 202 coupled to the cold pate component 214 and enclosing an interior lumen within which a cooling fluid can circulate. A cylindrical tubing hinge 206 extends around and couples two segments 208, 210 of the tubing and enables rotational motion of one segment 208 relative to the other 210, flexibly enabling movement of the cover plate 216.

Figure 3A:
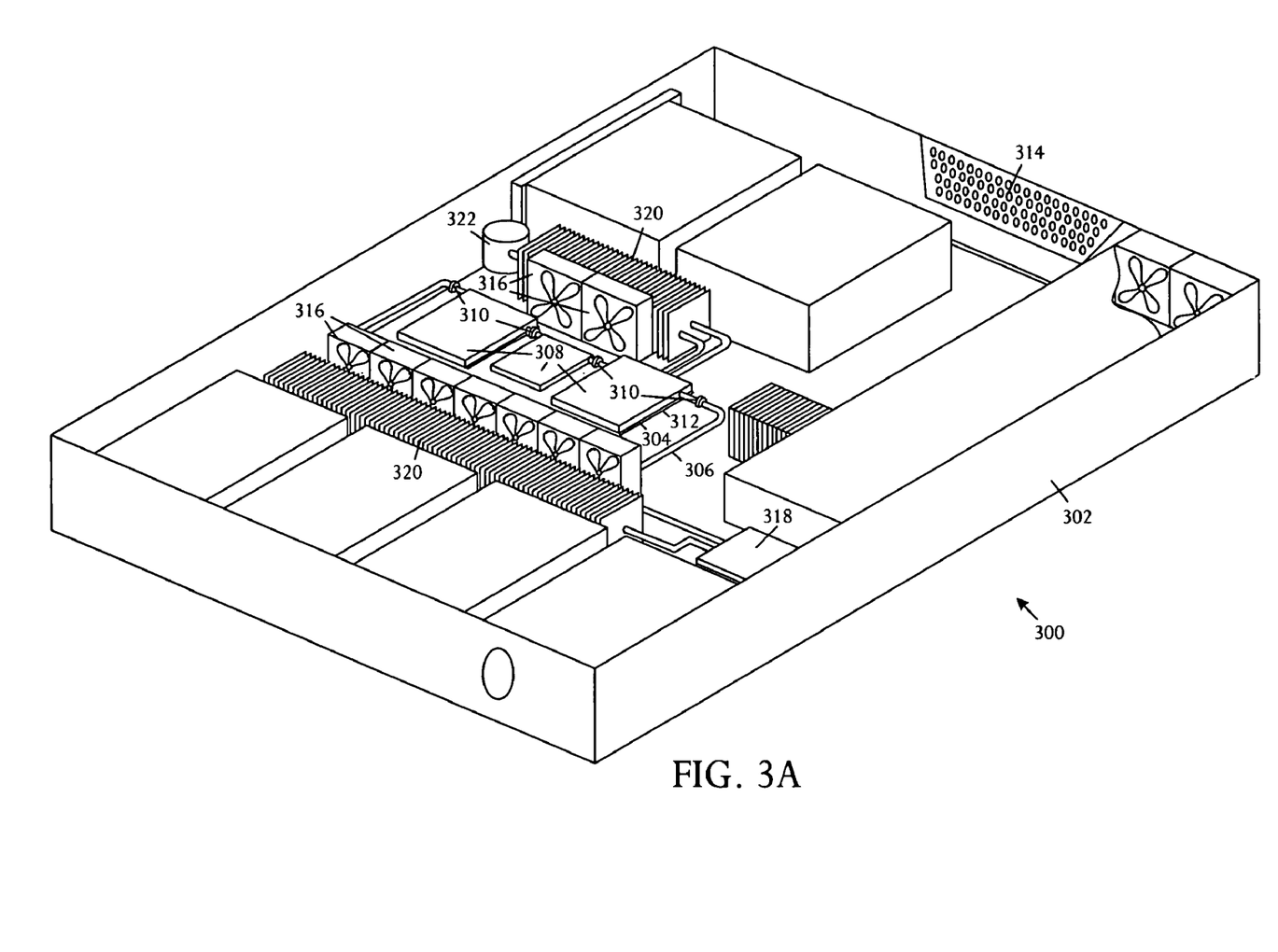
FIGS. 3A and 3B show a perspective pictorial diagram and an overhead pictorial view illustrating embodiments of an electronic system with a liquid loop cooling system using a tubing hinge to facilitate serviceability.
Figure 3B:
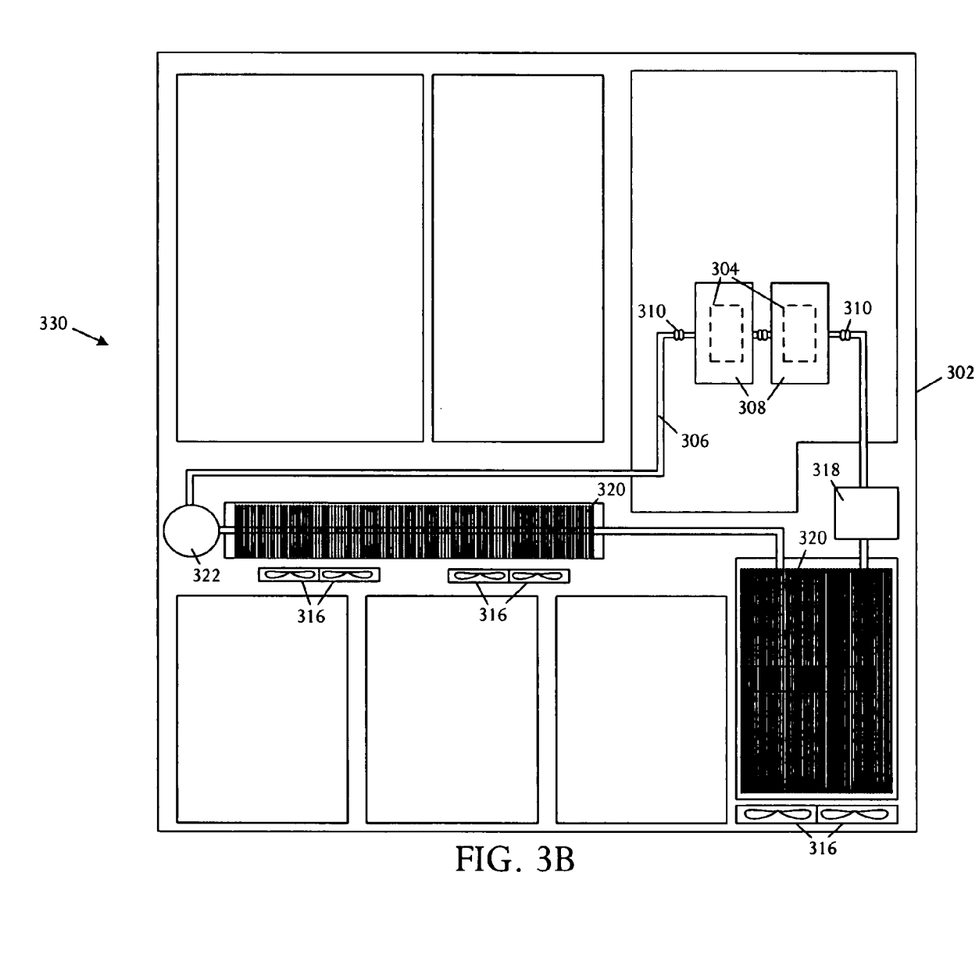

Referring to FIGS. 3A and 3B, a perspective pictorial diagram and an overhead pictorial view illustrate embodiments of different electronic systems 300 and 330 respectively, such as a computer server, that comprises a chassis 302, a plurality of components 304 mounted within the chassis 302 including at least one heat-generating component. Rigid or semi-rigid tubing 306 enclosing an interior bore contains a cooling fluid that circulates among the components 304 in a closed-loop system. A moveable cold plate 308 is rigidly coupled to the tubing 306. A cylindrical tubing hinge 310 extends around and couples two segments of the tubing, enabling rotational motion of one segment relative to the other, flexibly enabling movement of the moveable cold plate 308.

Hinges 310 are typically implemented in pairs in tube segments of the liquid loop on each side of the moveable cold plate 308. Hinges 310 can be used on one or more of the other tubing legs, depending on the circumstances of mechanical isolation. FIGS. 1A, 1B, and 1C depict a suitable tubing hinge 100, 310 for usage with the electronic system 300.

The cold plate 308 is moveable to enable addition, replacement, or removal of the heat-dissipating component 304. The cold plate 308 can be rotated up and away from the heat-dissipating component 304 to enable access to the heat-dissipating component 304. Commonly, the heat-dissipating component 304 is associated and attached to the cold plate 308. Accordingly, the moveable cold plate 308 often encloses the associated heat-dissipating component 304.

The electronic system 300 also includes airflow inlet and outlet vents 314 in the chassis 302, and one or more fans 316 that can force air from the inlet vents to the outlet vents 314.

In some embodiments, the electronic system 300 is efficiently sized into a relatively small package, for example with the chassis 302 configured as a compact form factor chassis. Common compact sizes are of the order of 1U or 2U form factors.

The electronic system 300 may also optionally include a pump 318 that can be coupled to the tubing 306 to assist in circulating cooling fluid through the liquid loop. In other embodiments, a pump may be omitted, for example using gravity-assistance or a wick structure in the tubing to facilitate fluid flow. For example, pumping action can be gained using a two-phase heat-transport device that exploits surface tension forces induced in a fine pore wick under heat application to drive a working fluid.

Another optional component of the liquid loop cooling system is a liquid-to-air heat exchanger 320 that can be coupled to the tubing 306. A further optional component is a reservoir 322 that can be coupled to the tubing for accumulating cooling fluid.

Liquid loop cooling may be used in various applications for the thermal management of electronics resulting from increasing power densities in power electronics, defense, medical, and computer applications. Liquid loop cooling is increasingly useful for high-end servers, storage systems, telecommunication equipment, automatic test equipment, and the like as a result of enhancements in power densities and reduction packaging size.

Liquid loop cooling systems use closed-loop circulation of a coolant and may include flow distribution components such as tubes and pumps, flow control devices including valves and orifices, and heat transfer devices such as cold plates and heat exchangers. The designs of liquid loop cooling systems are generally arranged to create and distribute a sufficient total flow to maintain electronic component temperature at a suitable level.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, although particular shapes, sizes, and geometries of hinges are shown, other arrangements are possible. Also, particular electronic system embodiments are illustrated, for example a computer server. In other embodiments, the hinges can be employed in other types of electronic systems such as communication systems, storage systems, entertainment systems, and the like.

What is claimed is:

1. A liquid loop cooling apparatus comprising:
   a liquid cooling loop tubing enclosing an interior lumen within which a cooling fluid can circulate;
   a cold plate rigidly coupled to the liquid cooling loop tubing; and
   a tubing hinge coupled into the liquid cooling loop tubing and attaching the liquid cooling loop tubing to the cold plate, enabling rotational motion of the cold plate relative to the liquid cooling loop tubing.

2. The cooling apparatus according to claim 1 further comprising:
   a heat-dissipating component coupled to the cold plate, the cold plate being rotationally moveable to enable addition, replacement, or removal of the heat-dissipating component.

3. The cooling apparatus according to claim 2 wherein:
   the cold plate configured for rotation up and away from the heat-dissipating component to enable access to the heat-dissipating component.

4. The cooling apparatus according to claim 1 wherein the tubing hinge further comprises:
   first and second tubing segments adapted to couple into the liquid cooling loop tubing and arranged to share a common longitudinal axis, the first and second tubing segments terminating in respective first and second tube ends;
   a raised lip on the first tube end extending radially outward relative to the longitudinal axis; and
   a raised groove on the second tube end extending radially outward and returning radially inward relative to the longitudinal axis in a longitudinal second tubing segment section.

5. The cooling apparatus according to claim 4 further comprising:
   a ring encircling a longitudinal segment of the first tubing segment adjacent and restrained by the raised lip and contained within the raised groove of the second tube end, the first tube end and the ring being inserted into the second tube end so that the first tube end raised lip and the ring are confined within the second tube end raised groove.

6. The cooling apparatus according to claim 1 further comprising:
   a male end connector coupled to a first tubing segment; and
   a female end connector coupled to a second tubing segment, the male end connector being capable of insertion into the second tubing segment female end connector, the female end connector arresting linear motion of the male end connector from the female end connector while enabling rotational motion of the first and second tubing segments about a rotational axis.

7. An electronic system comprising:
   a chassis;
   a plurality of components mounted within the chassis including at least one heat-generating component;
   a rigid or semi-rigid liquid cooling loop tubing enclosing an interior lumen within which a cooling fluid circulates;
   a cold plate rigidly coupled to the liquid cooling loop tubing and cooled by the cooling liquid in the liquid cooling loop tubing; and
   a tubing hinge coupled into the liquid cooling loop tubing and coupled to the cold plate to enable rotational motion of cold plate relative to the liquid cooling loop tubing.

8. The electronic system according to claim 7 further comprising:
   a heat-dissipating component coupled to the cold plate, the cold plate being rotationally moveable to enable addition, replacement, or removal of the heat-dissipating component.

9. The electronic system according to claim 7 wherein:
   the cold plate is configured for rotation up and away from the heat-dissipating component to enable access to the heat-dissipating component.

10. The electronic system according to claim 7 wherein the tubing hinge further comprises:
    first and second tubing segments adapted to couple the tubing hinge into the liquid cooling loop tubing and arranged to share a common longitudinal axis, the first and second tubing segments terminating in respective first and second tube ends;
    a raised lip on the first tube end extending radially outward relative to the longitudinal axis; and
    a raised groove on the second tube end extending radially outward and returning radially inward relative to the longitudinal axis in a longitudinal second tubing segment section.

11. The electronic system according to claim 10 further comprising:
    a ring encircling a longitudinal segment of the first tube adjacent and restrained by the raised lip and contained within the raised groove of the second tube end, the first tube end and the ring being inserted into the second tube end so that the first tube end raised lip and the ring are confined within the second tube end raised groove.

12. The electronic system according to claim 7 further comprising:
    a male end connector coupled to a first tubing segment; and
    a female end connector coupled to a second tubing segment, the male end connector being capable of insertion into the second tubing segment female end connector, the female end connector arresting linear motion of the male end connector from the female end connector while enabling rotational motion of the first and second tubing segments about a rotational axis.

13. A method of constructing a tubing hinge comprising:
    forming on an end of a first tubing segment a raised lip extending radially outward relative to a longitudinal axis of the first tubing segment;
    forming on an end of a second tubing segment a raised groove extending radially outward and returning radially inward relative to a longitudinal axis in a in a longitudinal second tubing segment section;

coupling the first tubing segment and the second tubing segment into a liquid cooling loop tubing at a cold plate; and inserting the first tubing segment end into the second tubing segment end whereby the first tubing segment end raised lip is confined within the second tubing segment end raised groove, the first tubing segment and the second tubing segment forming the tubing hinge that enables the cold plate to rotate relative to the liquid cooling loop tubing.

14. The method according to claim 13 further comprising:

encircling a longitudinal portion of the first tubing segment with a ring so that the ring is adjacent to and restrained by the raised lip and contained within the raised groove of the second tubing segment.

15. A liquid loop cooling apparatus comprising:

a cold plate component further comprising:
 a heat-dissipating component; and
 a cover plate convertibly enclosing the heat-dissipating component;

rigid or semi-rigid liquid cooling loop tubing coupled to the cold plate component and enclosing an interior lumen within which a cooling fluid can circulate; and a tubing hinge coupled into the liquid cooling loop tubing and enabling rotational motion of the cover plate relative to the liquid cooling loop tubing.

16. The cooling apparatus according to claim 15 wherein the tubing hinge further comprises:

first and second tubing segments adapted to couple the tubing hinge into the liquid cooling loop tubing and arranged to share a common longitudinal axis, the first and second tubing segments terminating in respective first and second tube ends;

a raised lip on the first tube end extending radially outward relative to the longitudinal axis; and a raised groove on the second tube end extending radially outward and returning radially inward relative to the longitudinal axis in a longitudinal second tubing segment section.

\* \* \* \* \*